United States Patent
Matsubara et al.

(10) Patent No.: US 6,914,790 B2
(45) Date of Patent: Jul. 5, 2005

(54) MOTOR DRIVING CONTROLLER

(75) Inventors: Shunsuke Matsubara, Yamanashi (JP);
Naoyuki Suzuki, Yamanashi (JP);
Kiichi Inaba, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/443,065

(22) Filed: May 22, 2003

(65) Prior Publication Data

US 2003/0235060 A1 Dec. 25, 2003

(30) Foreign Application Priority Data

Jun. 19, 2002 (JP) ........................................ 2002-178722

(51) Int. Cl.[7] ................................................ H02J 3/00
(52) U.S. Cl. ............................................................ 363/34
(58) Field of Search ........................... 363/34, 37, 142;
318/727, 798, 806, 812

(56) References Cited

U.S. PATENT DOCUMENTS

| | | | | |
|---|---|---|---|---|
| 5,387,859 A | * | 2/1995 | Murugan et al. | ............. 322/10 |
| 5,949,663 A | * | 9/1999 | Endo et al. | .................... 363/37 |
| 6,134,124 A | * | 10/2000 | Jungreis et al. | ............... 363/34 |
| 6,232,742 B1 | * | 5/2001 | Wacknov et al. | ........... 318/811 |

FOREIGN PATENT DOCUMENTS

| WO | WO 95/06973 | 3/1995 |
|---|---|---|
| WO | WO 99/52193 | 10/1999 |

* cited by examiner

Primary Examiner—Matthew V. Nguyen
(74) Attorney, Agent, or Firm—Staas & Halsey LLP

(57) ABSTRACT

A motor driving controller that drivingly controls motors for individual axes of an object of control comprises an AC/DC converter circuit for converting AC power into DC power and motor driving DC/AC converter circuits for converting DC power into AC power of optional frequency, for each motor. The controller further comprises an interface through which DC power from the AC/DC converter circuit is delivered to the outside. If motors for peripheral axes are added, motor driving DC/AC conversion devices are added and connected to the interface, whereby DC power is supplied.

16 Claims, 5 Drawing Sheets

PRIOR ART  FIG. 3
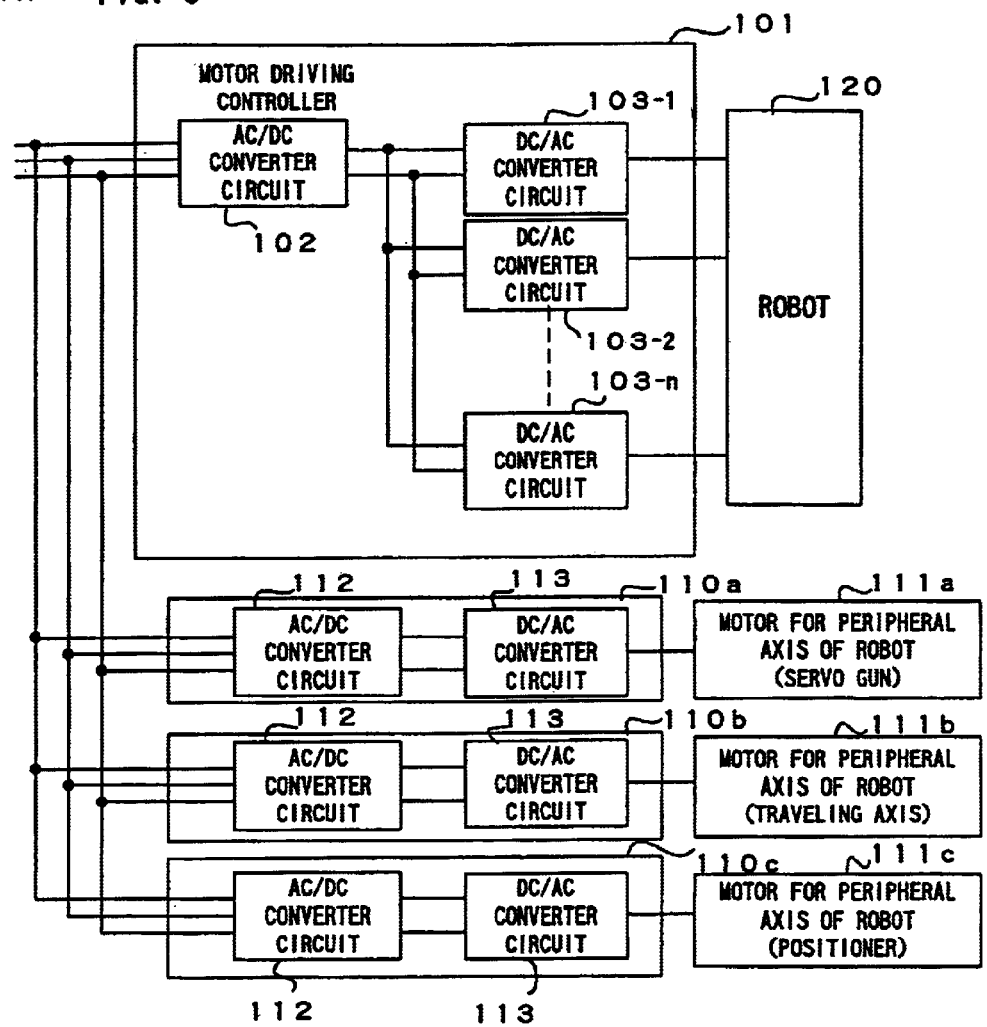

PRIOR ART FIG. 4
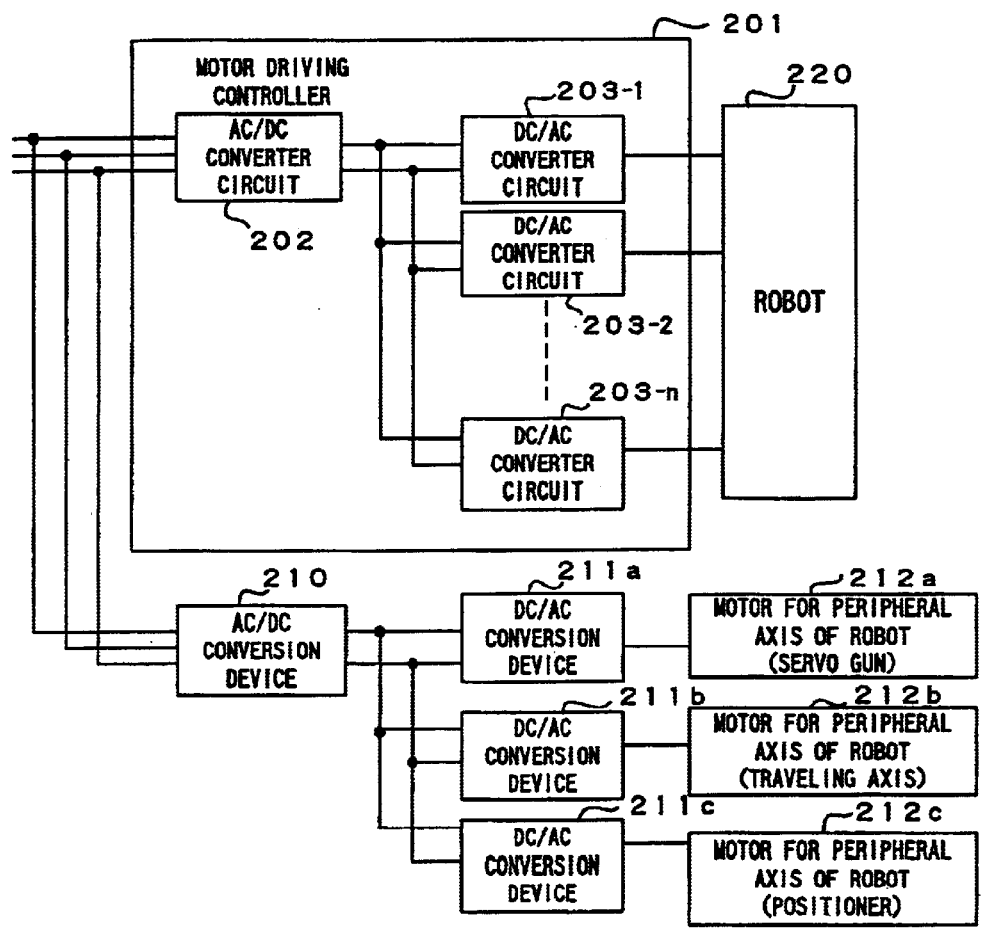

PRIOR ART    FIG. 5
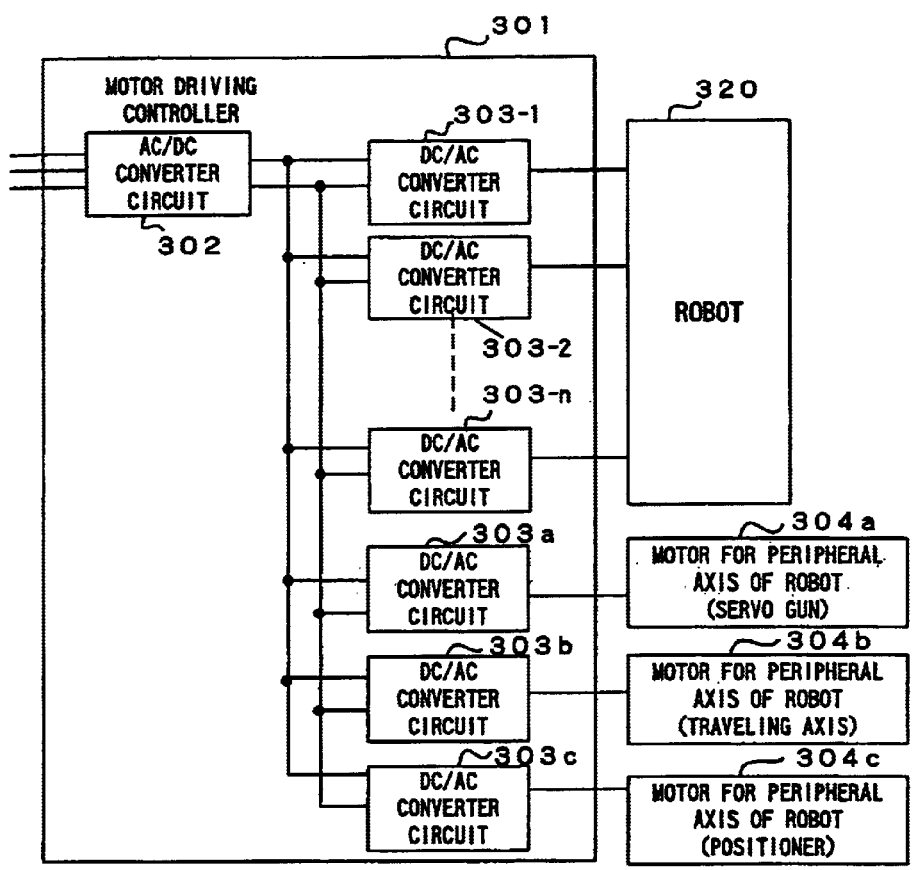

MOTOR DRIVING CONTROLLER

BACKGROUND OF THE INVENTION

1. Field of the Invention

The present invention relates to a motor driving controller for drivingly controlling motors attached to a machine tool, industrial equipment, robot, etc.

2. Description of the Related Art

In a motor driving controller that drive axes of a machine tool, industrial equipment, robot, etc., commercial AC power is temporarily converted into DC power, and then the DC power is converted into AC power of optional frequency and used to drive the motors drivingly. More specifically, the conventional motor driving controller is provided with an AC/DC converter circuit for converting commercial AC power into DC and motor driving DC/AC converter circuits for converting the DC power, the output of the AC/DC converter circuit, into AC power of optional frequency.

The motor driving controller comprises one AC/DC converter circuit and motor driving DC/AC converter circuits as many as the control axes (or motors) of the machine tool, industrial equipment, or robot to be controlled. For controlling motors for the peripheral device, that is, peripheral axis motors, another motor driving controller, which includes an AC/DC converter circuit and motor driving DC/AC converter circuits, or an AC/DC conversion device and DC/AC conversion devices are additionally used.

FIG. 3 shows an example in which a motor driving controller is additionally used to drive the peripheral axes. In this example, a motor driving controller 101 for the axes of a robot 120 is provided with motors 111a, 111b and 111c as motors for the peripheral axes. The motor (motor for servo gun) 111a is used to drive the tip of a spot welding gun that is attached to the wrist of a robot arm. The motor 111b is a traveling axis motor that is used to run the robot. The motor 111c is used to drive a positioner for positioning and feeding a workpiece or the like. Motor driving controllers 110a, 110b and 110c for drivingly controlling the motors 111a, 111b and 111c for robot peripheral axes are attached to the controller 101 that drives the motors of the robot 120.

The motor driving controller 101 that drivingly controls the motors for the axes of the robot 120 comprises one AC/DC converter circuit 102 for converting commercial AC power into DC power and DC/AC converter circuits 103-1 to 103-n for motor drive as many as the control axes of the robot 120. The DC/AC converter circuits 103-1 to 103-n convert the DC power, the output of the AC/DC converter circuit 102, into AC power of optional frequency and drive the motors.

The motors for the control axes of the robot 120 are drivingly controlled by means of the motor driving controller 101, whereby the robot 120 is operated. If the peripheral axes of the robot; such as axis of a servo gun, traveling axis, or positioner, are drivingly controlled, the motor driving controllers 110a, 110b and 110c as shown in FIG. 3 are used. Each of the motor controllers 110a, 110b and 110c is provided with an AC/DC converter circuit 112 and a motor driving DC/AC converter circuit 113. The AC/DC converter circuit 112 converts commercial AC power into DC power. The DC/AC converter circuit 113 converts the DC power, the output of the AC/DC converter circuit 112, into AC power of optional frequency.

Servo control circuits, which comprises a speed control circuit, position/speed control circuit, current control circuit, etc. for controlling the DC/AC converter circuits 103-1 to 103-n, in the controller 101 for driving the motors for respective axes of the robot 120, and controlling the respective positions, speeds, and currents of the motors for the axes of the robot 120, may be provided in the controller 101 or a robot controller or a host controller of the controller 101. Alternatively, the servo control circuits may be provided independently of these devices. In controlling the speeds, the speed control circuit and the current control circuit control the DC/AC converter circuits 103-1 to 103-n in response to a command from the robot controller serving as a host computer. In also controlling the positions, the position control circuit, the speed control circuit, and the current control circuit control the DC/AC converter circuits 103-1 to 103-n, thereby controlling the positions, speeds, and torques.

Further provided are servo control circuits, such as a position control circuit, speed control circuit, current control circuit, etc. for driving the respective DC/AC converter circuits 113 of the motor driving controllers 110a, 110b and 110c that are used drivingly to control the motors 111a, 111b and 111c for the peripheral axes of the robot. In many cases, the motors 111a, 111b and 111c for the peripheral axis of the robot are controlled in synchronism with the robot 120. Accordingly, their servo circuits, along with the respective servo control circuits of the DC/AC converter circuits 103-1 to 103-n of the motor driving controller 101, are controlled by means of the robot controller.

In the prior art example shown in FIG. 3, the motor driving controllers 110a, 110b and 110c comprising the AC/DC converter circuits 112 and the motor driving DC/AC converter circuits 113 for the motors 111a, 111b and 111c which drivingly controls peripheral axes of the robot must be additionally provided. Accordingly, such peripheral axes cannot be added at low cost.

FIG. 4 shows another prior art example of addition of the motor driving controller for peripheral axes. The motor driving controllers 110a, 110b and 110c of the prior art example shown in FIG. 3 are replaced with one AC/DC converter circuit 210 and motor driving DC/AC converter circuits 211a, 211b and 211c for motors 212a, 212b and 212c for peripheral axes. The AC/DC converter circuit 210 converts commercial AC power into DC power. On receiving the converted DC power, the DC/AC converter circuits 211a, 211b and 211c convert the DC power into AC power of optional frequency, thereby drivingly controlling the motors 212a, 212b and 212c for peripheral axes. This example shares other particulars with the prior art example shown in FIG. 3.

The AC/DC converter circuit 210 and the motor driving DC/AC converter circuits 211a, 211b and 211c must be also added in this case, so that the addition of the peripheral axis control costs high.

FIG. 5 shows a motor driving controller 301 for controlling motors for the axes of a robot as a prior art example, in which motor driving DC/AC converter circuits for peripheral axes are provided in advance.

Motor driving DC/AC converter circuits 303a, 303b and 303c for drivingly controlling peripheral axis motors 304a, 304b and 304c for a robot 320, besides motor driving DC/AC converter circuits 303-1 to 303-n for drivingly controlling motors for the axes of the robot 320, are provided in the motor driving controller 301. In the example shown in FIG. 5, the three motor driving DC/AC converter circuits are provided in advance. The controller 301 is provided with only one AC/DC converter circuit 302 for converting AC power into DC power. The DC power or the output of the converter circuit 302 is applied to the motor driving DC/AC converter circuits 303-1 to 303-n and the DC/AC converter circuits 303a, 303b and 303c.

If there is a motor for a peripheral axis of a robot such as a servo gun, besides the motors for driving the axes of the robot 320, the motor to be drivingly controlled is connected to one of the motor driving DC/AC converter circuits for the peripheral axes, e.g., the DC/AC converter circuit 303a.

In the prior art example shown in FIG. 3, a motor driving controller that is formed of an AC/DC converter circuit and motor driving DC/AC converter circuits must be added for each motor for a peripheral axis of a robot to be controlled. Thus, the peripheral axes cannot be added at low cost. In the example shown in FIG. 4, moreover, the motor driving DC/AC converter circuits 211a, 211b and 211c as many as the motors for peripheral axes must be added, as well as the AC/DC converter circuit 210. In this case, the peripheral axes cannot be added at low cost either.

In the prior art example shown in FIG. 5, furthermore, the motor driving DC/AC converter circuits as many as the peripheral axes are previously located in the motor driving controller. If the controller is used in an application system that requires no peripheral axes, therefore, the added DC/AC converter circuits are useless, so that the controller is inevitably expensive. Since the motor driving DC/AC converter circuits are provided in advance, moreover, it is hard to select the motor type flexibly.

OBJECT AND SUMMARY OF THE INVENTION

The object of the present invention is to provide a motor driving controller, designed so that peripheral axes can be added at low cost.

According to the present invention, there is provided a motor driving controller, which has an AC/DC converter circuit and a motor driving DC/AC converter circuit for converting DC power delivered from the AC/DC converter circuit into AC power for motor drive, and drives a multi-joint robot. The controller comprises an interface through which the DC power from the AC/DC converter circuit can be supplied to the outside of the motor driving controller. The DC power from the AC/DC converter circuit can be supplied through the interface to a DC/AC conversion device having at least one motor driving DC/AC converter circuit attached to the outside of the motor driving controller.

The motor driving controller further comprises an interface capable of transmitting to or receiving control signals or state signals from the motor driving DC/AC conversion device.

According to the present invention, peripheral axes can be easily added by only adding motor driving DC/AC converter circuits for motors for the peripheral axes as required. Thus, an optimum system can be constructed at low cost without waste, using an optimum motor driving DC/AC conversion device for the peripheral axis motors.

BRIEF DESCRIPTION OF THE DRAWINGS

FIG. 3 is a block diagram showing the principal part of a conventional motor driving controller applied to a robot system;

FIG. 4 is a block diagram showing the principal part of another example of a conventional motor driving controller applied to a robot system; and FIG. 5 is a block diagram showing the principal part of still another example of a conventional motor driving controller applied to a robot system.

DETAILED DESCRIPTION OF THE PREFERRED EMBODIMENT

Figure 1:
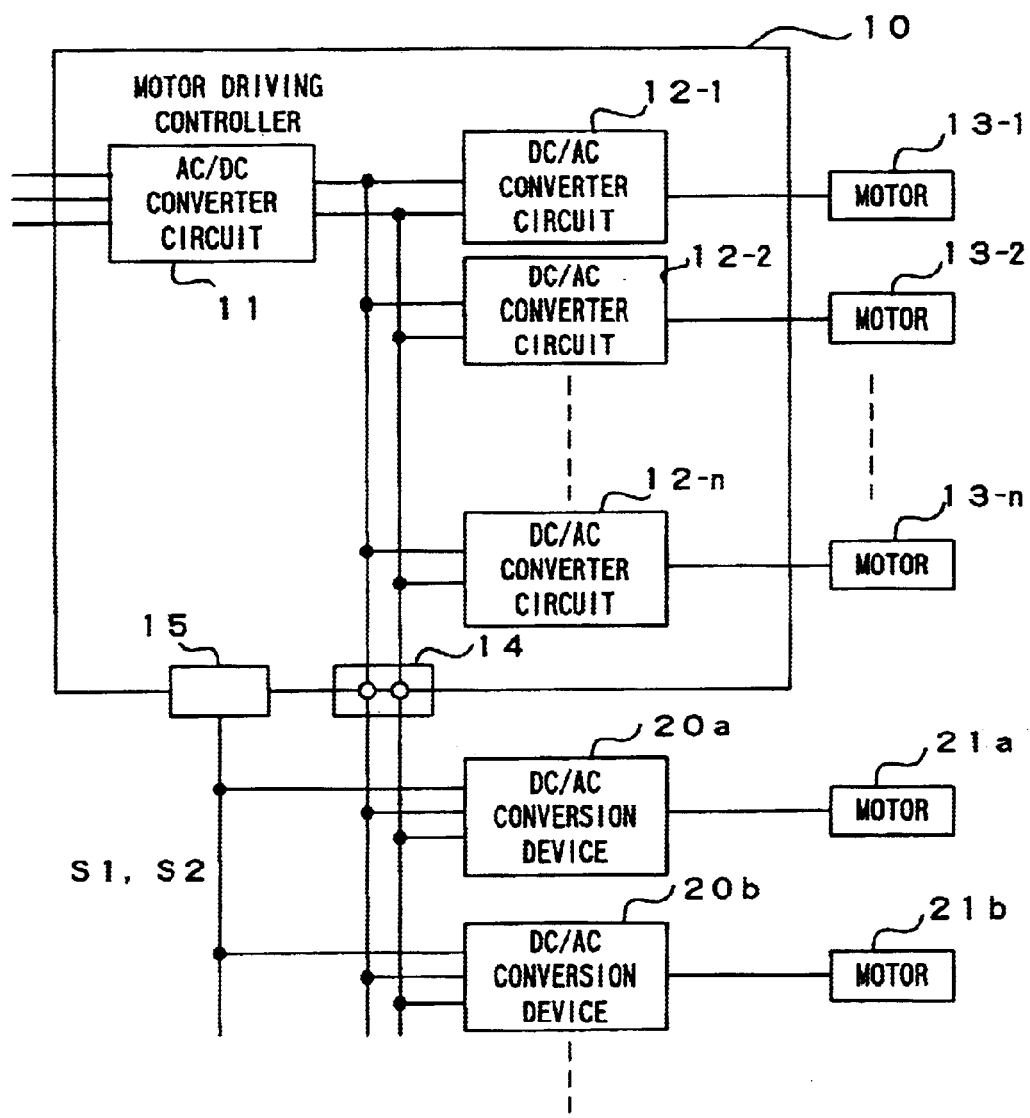
FIG. 1 is a block diagram showing the principal part of a system using a controller for motor driving According to an embodiment of the present invention.

FIG. 1 is a block diagram showing the principal part of a system according to one embodiment of the present invention.

A motor driving controller 10 is provided with one AC/DC converter circuit 11 for converting commercial AC power into DC power. Further, DC/AC converter circuits 12-1 to 12-n for motor drive are provided corresponding individually to motors for control axes of a machine tool, industrial equipment, robot, etc. as an object of control. Further, an interface 14 is used to supply DC power to motor driving DC/AC conversion devices 20a, 20b, . . . for drivingly controlling motors for peripheral axes. The motors for peripheral axes are for driving control axes of peripheral devices and equipments arranged around the object of control.

DC power, the output of the AC/DC converter circuit 11, is applied to the motor driving DC/AC converter circuits 12-1 to 12-n. The respective outputs of the circuits 12-1 to 12-n are connected to their corresponding motors 13-1 to 13-n for the axes of the object of control. DC power is converted into AC power of optional frequency in the DC/AC converter circuits 12-1 to 12-n, whereby the motors 13-1 to 13-n are drivingly controlled.

The DC power, the output of the AC/DC converter circuit 11, is also delivered to the interface 14. The interface 14 can be connected with one or more motor driving DC/AC conversion devices, which have a motor driving DC/AC converter circuit each. An optional number of motor driving DC/AC conversion devices are connected corresponding to peripheral axes or the control axes of the peripheral devices and equipments of the object of control. In the example of FIG. 1, the two motor driving DC/AC conversion devices 20a and 20b are connected to the interface 14 and supplied with DC power. These DC/AC conversion devices 20a and 20b drivingly control motors 21a and 21b for peripheral axes, respectively.

Servo control circuits, such as a speed control circuit or a position/speed control circuit for controlling the respective speeds or the respective positions and speeds of the motors 13-1 to 13-n for the axes of the object of control, a current control circuit, etc., may be provided in the motor driving controller 10 or a host controller (CNC or robot controller) of the controller 10. Alternatively, the servo control circuits may be provided independently of the motor driving controller 10 and the host controller.

In response to a position command or speed command from the host controller, these servo control circuits carry out current control as well as the position/speed control or speed control, and drivingly controls the motor driving DC/AC converter circuits 12-1 to 12-n, thereby controlling the respective positions and speeds of the motors 13-1 to 13-n.

The motor driving controller 10 is provided with an interface 15 for control if it has therein servo control circuits for the DC/AC conversion devices 20a, 20b, . . . that drivingly control the motors 21a, 21b, . . . for peripheral axes to be added to the motor driving controller 10. In this arrangement, control signals S1 and state signals S2 can be transferred between the devices 20a and 20b and their corresponding servo control circuits.

Thus, the motor driving controller 10 according to the present invention differs from the conventional motor driving controller 10 shown in FIGS. 3 to 5 only in that it is provided with the interface 14 that can supply DC power from the AC/DC converter circuit 11 to the external devices.

The interface 14 should only be connected with a necessary number of motor driving DC/AC conversion devices 20a, 20b, . . . corresponding to the motors for peripheral axes around the object of control. The peripheral axes can be added at lower cost, compared with those of the prior art example shown in FIG. 3, since the motors for peripheral axes need not be furnished with any motor driving controller.

When compared with the prior art example shown in FIG. 4, the peripheral axes can be added at lower cost, since the AC/DC conversion device 210 for peripheral axes is unnecessary.

In the prior art example shown in FIG. 5, moreover, a plurality of motor driving DC/AC converter circuits for peripheral axes are provided in advance in the motor driving controller. According to the present invention, on the other hand, the DC/AC conversion devices should only be added as required. Thus, there is no DC/AC converter circuit which is not used, so that waste can be avoided. Since the DC/AC conversion devices for motor drive are added, optimum DC/AC conversion devices can be used corresponding to the motors for peripheral axes, so that the system can be constructed with ease.

Figure 2:
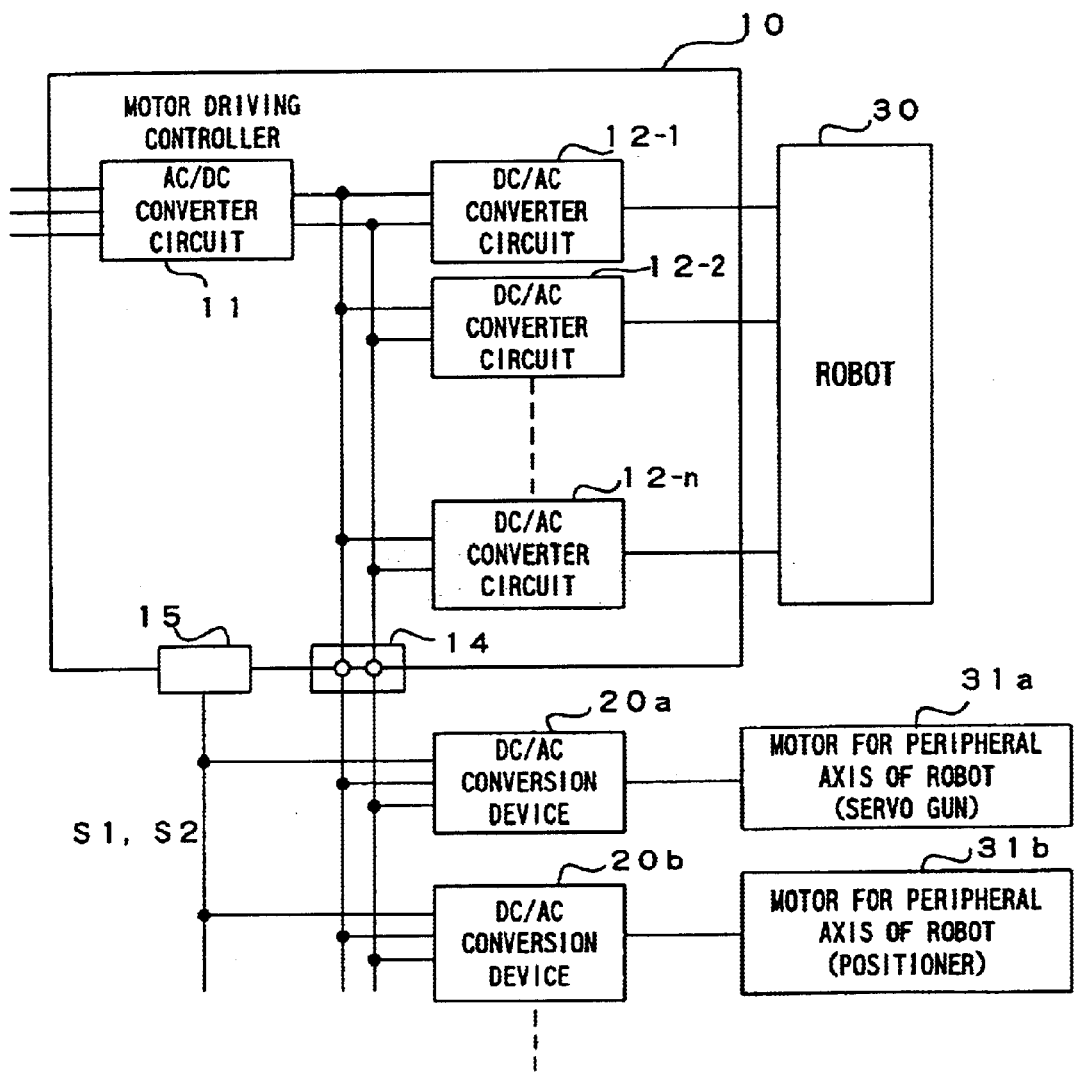
FIG. 2 is a block diagram showing the principal part of the embodiment applied to a robot system.

FIG. 2 is a block diagram showing the principal part of a robot system in which the motor driving controller 10 of the invention is applied to a robot. Like numerals are used to designate like elements in FIGS. 1 and 2.

The motor driving DC/AC converter circuits 12-1 to 12-n of the motor driving controller 10 are connected individually to motors for the respective control axes of the robot 30. The motor driving DC/AC conversion devices 20a and 20b for motors 31a and 31b for peripheral axes of the robot are attached to the outside of the controller 10. The motor 31a is used to drive the tip of a servo gun for spot welding that is attached to the wrist of a robot arm. The motor 31b is used to drive a positioner for transporting and positioning a workpiece or the like as an object of operation of the robot. The DC/AC conversion devices 20a and 20b are connected to the interface 14 so that they can be supplied with the DC current from the AC/DC converter circuit 11 through the interface 14. Further, the motor driving DC/AC conversion devices 20a and 20b are connected to the motor 31a for the servo gun and the motor 31b for the positioner, respectively.

Furthermore, the DC/AC conversion devices 20a and 20b for motor drive are connected to the servo control circuits (not shown) through the interface 15 that is attached to the motor driving controller 10. Thus, the control signal S1 and state signal S2 can be transferred between the DC/AC conversion devices 20a and 20b and their corresponding servo control circuits.

In drivingly controlling the motors for peripheral devices that surround the robot, in the example shown in FIG. 2, the DC/AC conversion devices as many as the peripheral axis motors to be driven must only be connected to the interface 14. Thus, the peripheral axes can be added at low cost without waste.

What is claimed is:

1. A motor driving controller, which has an AC/DC converter circuit and a motor driving DC/AC converter circuit for converting DC power delivered from the AC/DC converter circuit into AC power for motor drive, comprising:

an interface through which the DC power from the AC/DC converter circuit can be supplied to the outside of the motor driving controller, wherein the DC power from the AC/DC converter circuit can be supplied through said interface to a motor driving DC/AC conversion device having at least one motor driving DC/AC converter circuit attached to the outside of the motor driving controller.

2. The motor driving controller according to claim 1, which further comprises an interface capable of transmitting to or receiving control signals or state signals from the motor driving DC/AC conversion device.

3. A motor driving controller for driving a multi-joint robot, which has an AC/DC converter circuit and a motor driving DC/AC converter circuit for converting DC power delivered from the AC/DC converter circuit into AC power for motor drive, comprising:

an interface through which the DC power from the AC/DC converter circuit can be supplied to the outside of the motor driving controller, wherein the DC power from the AC/DC converter circuit can be supplied through the interface to a DC/AC conversion device having at least one motor driving DC/AC converter circuit attached to the outside of the motor driving controller.

4. The motor driving controller according to claim 3, which further comprises an interface capable of transmitting to or receiving control signals or state signals from the DC/AC conversion device.

5. A controller comprising:

an AC/DC converter circuit;

one or more DC/AC converter circuits; and an interface that connects the AC/DC converter circuit to one or more DC/AC conversion devices located outside of the controller.

6. The controller of claim 5 wherein:

the interface supplies DC power to the DC/AC conversion devices.

7. The controller of claim 5 wherein:

the interface communicates control signals to or from the DC/AC conversion devices.

8. The controller of claim 5 wherein:

the DC/AC converter circuits drive motors; and the DC/AC conversion devices drive motors.

9. The controller of claim 8 wherein:

the motors driven by the DC/AC converter circuits are associated with a robot.

10. A controller comprising:

an AC/DC converter circuit;

one or more DC/AC converter circuits; and an interface that connects the AC/DC converter circuit to one or more DC/AC conversion devices located outside of the controller, wherein:

the DC/AC converter circuits are associated with a primary device; and the DC/AC conversion devices are associated with one or more secondary devices that are peripheral to the primary device.

11. The controller of claim 10 wherein:

the interface supplies DC power to the DC/AC conversion devices.

12. The controller of claim 10 wherein:

the interface communicates control signals to or from the DC/AC conversion devices.

13. The controller of claim 10 wherein:

the DC/AC converter circuits drive motors; and the DC/AC conversion devices drive motors.

14. The controller of claim 10 wherein:

the primary device is a robot.

15. The controller of claim 14 wherein:

the secondary device is a servo gun.

16. The controller of claim 14 wherein:

the secondary device is a positioner.

\* \* \* \* \*